United States Patent
Iny

(10) Patent No.: US 7,990,858 B2
(45) Date of Patent: Aug. 2, 2011

(54) METHOD, DEVICE AND SYSTEM OF SCHEDULING DATA TRANSPORT OVER A FABRIC

(75) Inventor: Ofer Iny, Woodland Hills, CA (US)

(73) Assignee: Dune Networks, Inc., Irvine, CA (US)

( * ) Notice: Subject to any disclaimer, the term of this patent is extended or adjusted under 35 U.S.C. 154(b) by 0 days.

(21) Appl. No.: 12/618,734

(22) Filed: Nov. 15, 2009

(65) Prior Publication Data

US 2010/0061392 A1    Mar. 11, 2010

Related U.S. Application Data

(63) Continuation of application No. 11/653,941, filed on Jan. 17, 2007, now Pat. No. 7,619,970.

(60) Provisional application No. 60/795,191, filed on Apr. 27, 2006.

(51) Int. Cl.
    *H04L 12/56* (2006.01)
(52) U.S. Cl. .......................... 370/229; 370/389; 370/413
(58) Field of Classification Search .................. None
    See application file for complete search history.

(56) References Cited

U.S. PATENT DOCUMENTS

| | | | |
|---|---|---|---|
| 6,172,963 B1 * | 1/2001 | Larsson et al. ................. | 370/229 |
| 6,647,019 B1 * | 11/2003 | McKeown et al. ............. | 370/422 |
| 6,771,596 B1 | 8/2004 | Angle et al. | |
| 6,813,274 B1 | 11/2004 | Suzuki et al. | |
| 7,035,212 B1 | 4/2006 | Mittal et al. | |
| 7,149,212 B2 * | 12/2006 | Calvignac et al. ............. | 370/360 |
| 7,339,944 B2 * | 3/2008 | Vandenhoudt et al. ........ | 370/419 |
| 7,362,702 B2 * | 4/2008 | Terrell et al. ................... | 370/230 |
| 2003/0002509 A1 | 1/2003 | Vandenhoudt et al. | |
| 2003/0225737 A1 | 12/2003 | Mathews et al. | |
| 2003/0227926 A1 * | 12/2003 | Ramamurthy et al. .. | 370/395.42 |
| 2003/0227932 A1 * | 12/2003 | Meempat et al. .............. | 370/415 |
| 2004/0174814 A1 * | 9/2004 | Futral ............................ | 370/231 |

OTHER PUBLICATIONS

International Search Report for PCT/IL07/00507 mailed on Mar. 31, 2008.
Office Action regarding for U.S. Appl. No. 11/653,941, mailed on Jul. 3, 2008.
Office Action regarding for U.S. Appl. No. 11/653,941, mailed on Feb. 17, 2009.

* cited by examiner

*Primary Examiner* — Robert C Scheibel

(57) ABSTRACT

Embodiments of the invention provide systems, devices and methods to schedule data transport across a fabric, e.g., prior to actual transmission of the data across the fabric. In some demonstrative embodiments, a packet switch may include an input controller to schedule transport of at least one data packet to an output controller over a fabric based on permission information received from the output controller. Other embodiments are described and claimed.

19 Claims, 4 Drawing Sheets

METHOD, DEVICE AND SYSTEM OF SCHEDULING DATA TRANSPORT OVER A FABRIC

CROSS-REFERENCE TO RELATED APPLICATIONS

This application is a continuation application of U.S. patent application Ser. No. 11/653,941, now U.S. Pat. No. 7,619,970, filed Jan. 17, 2007, which claims the benefit of U.S. Provisional Application No. 60/795,191, filed Apr. 27, 2006, the entire disclosure of which is incorporated herein by reference.

TECHNICAL FIELD

Some demonstrative embodiments of the invention relate generally to scheduling data transport and, more particularly, to scheduling the transport of data, such as data packets, over a fabric.

BACKGROUND

Modern data networks, for example, computer networks, use variable sized, asynchronous, connectionless, packet switching mechanisms to transport data, e.g., in the form of data packets, among various network elements, also referred to as "nodes".

A packet switching device ("switch") employed in such networks includes a plurality of input ports to receive data packets from a plurality of "source" network elements, and a plurality of output ports connected to a plurality of "destination" network elements.

The switch includes buffers to temporarily store packets, due, for example, to temporary oversubscription and/or Quality of Service (QoS) requirements. Ideally, the switching device should employ a fully output buffered architecture, which may ensure work conserving operation, while placing no limit on, and simplifying the implementation of, packet scheduling mechanism per output.

However, a fully output buffered architecture may not be practical, e.g., for mid to high capacity switches. In such cases, a fabric-based architecture may be used, in which a plurality of input controllers are interconnected to a plurality of output controllers by a fabric, wherein each input/output controller may support a plurality of input/output ports. The interconnecting fabric is preferably non-blocking Some examples of a non-blocking fabric include a crossbar, buffered-crossbar, and shared memory buffered fabric.

Some fabrics may be self-routing, whereby routing information is attached to, or is associated with, the data packet or cell that is transported across the fabric. Self-routing fabrics may include, for example, buffered fabric or Ethernet switches.

Since a single physical fabric device may not have the capacity to support the entire capacity of the switching device, in some implementations, a fabric may be implemented using several physical devices. For example, striping of data across multiple devices may be implied to build a fabric from multiple physical devices.

Switching devices implementing a fabric-based architecture may have a constraint on the bandwidth that an input port may transmit to the fabric, on the bandwidth that an output port may receive from the fabric, and/or on the bandwidth that the fabric may transport from the input to the output. This constraint is typically measured by a quantity called "speedup". A speedup of N may relate to a symmetrical non-blocking fabric arrangement whereby an input/output controller receives/transmits from/to the source/destination network elements a maximum bandwidth normalized to 1, and transmits/receives to/from the non-blocking fabric a maximum bandwidth of N. A minimal speedup of 1 is required for a switching mechanism employing such an architecture to be work conserving. A switching device with speedup of M, wherein M is equal to the number of input controllers, is equivalent to an output queued switch.

If the speedup is smaller than M, a buffer may be required at the input controller. The buffer of the input controller may be organized into a plurality of Virtual Output Queues (VOQs), e.g., in order to prevent head of line blocking, to enable efficient fabric operation, and/or to simplify QoS implementation. The VOQ may include a queue in which all packets are destined to one output controller and, possibly, to one or more output ports of the output controller.

A buffer is also required at the output controller, e.g., in order to adapt the rate of traffic from the fabric to the rate of traffic transmitted to the output ports, if, for example, the switching device has a speedup greater than 1.

The typical buffered fabric architecture employs a QoS aware fabric. Due to the complexity and cost of implementation, the buffered fabric may typically implement buffering only per output controller and traffic class.

The fabric-based architecture may have a scheduling mechanism to coordinate and manage the transport of data from the VOQs, through the fabric, and to the output controllers and output controller ports, in accordance with pre-defined performance goals of the switching device. Systems employing QoS related scheduling in the fabric layer may be inefficient and may require a complex buffered fabric and high speedup for consistent data flow.

The switching devices described above may require a relatively high speedup, relatively complex fabric architectures, and/or large buffers at the output controllers, in order to provide efficient data flow and/or high QoS guarantees for data transport.

SUMMARY OF SOME DEMONSTRATIVE EMBODIMENTS OF THE INVENTION

Some demonstrative embodiments of the invention include systems, devices and/or methods to schedule data transport across a fabric interconnecting an input controller to an output controller, for example, by scheduling transport of a data packet over the fabric, prior to actual transmission of the data across the fabric. In some embodiments, the input controller may receive permission information that enables the input controller to schedule the data packet before transmission. The permission information may be based, for example, on status information from the input controller, and/or pre-defined or dynamic scheduling parameters.

According to some demonstrative embodiments, the input controller may arrange data packets according to their relative destination and/or priorities, for example, in one or more Virtual Output Queues (VOQs). In some embodiments, the input controller may request permission from an output controller intended to receive one or more packets from a specific VOQ. The output controller may grant permission to the input controller to transmit a specific amount or type of data, for example, from the specific VOQ, to be received by the output controller. Such permission may be granted, for example, by assigning transmission credit to the input controller.

According to some demonstrative embodiments of the invention, transmission credit may be assigned, e.g., in the form of an information signal, which may indicate an amount or type of data that the input controller may transmit to the output controller. Credit may be assigned, e.g., based on the state of data flow in the system, available space for the data to be stored in the output controller, the QoS profile associated with one or more data packets, and/or any other suitable criteria.

According to some demonstrative embodiments of the invention, a data packet switch may include an input controller to schedule transport of at least one data packet to an output controller over a fabric based on permission information received from the output controller, e.g., prior to transmitting the data packet over the fabric. The permission information may be generated by the output controller based, for example on status information from the input controller.

According to some demonstrative embodiments of the invention, the status information may include an indication relating to an amount of data pending transmission at the input controller.

According to some demonstrative embodiments of the invention, the at least one data packet may include a plurality of data packets. The input controller may manage a plurality of packet queues, e.g., including one or more Virtual Output Queues (VOQs). One or more of the queues, e.g., each of the packet queues, may be associated with one or more of the plurality of data packets intended for one or more output ports of the output controller.

According to some demonstrative embodiments of the invention, the input controller may update a plurality of credit balances corresponding to the plurality of packet queues, respectively, based on the permission information. The input controller may schedule transport of data packets associated with the plurality of packet queues based on the plurality of credit balances.

According to some demonstrative embodiments of the invention, the input controller may generate a request to the output controller to generate permission information corresponding to a packet queue of the plurality of packet queues based on at least one of a credit balance corresponding to the packet queue, a size of the packet queue, and an amount of data scheduled for transmission from the queue.

According to some demonstrative embodiments of the invention, the input controller may generate the request based on a difference between the credit balance corresponding to the packet queue and the size of the packet queue.

According to some demonstrative embodiments of the invention, the input controller may generate a request to the output controller to generate permission information corresponding to a packet queue of the plurality of packet queues based on one or more of the credit balances corresponding to one or more of the packet queues other than the packet queue.

According to some demonstrative embodiments of the invention, the input controller may schedule transmission over the fabric of one or more data packets of a queue of the packet queues if a credit balance corresponding to the queue is bigger than a predefined threshold.

According to some demonstrative embodiments of the invention, the input controller may update a credit balance corresponding to a packet queue of the plurality of packet queues when a data packet of the packet queue is transmitted.

According to some demonstrative embodiments of the invention, the plurality of credit balances may indicate a respective plurality of amounts of data, e.g., minimal amounts of data, to be transmitted from the plurality of packet queues over the fabric.

According to some demonstrative embodiments of the invention, the permission information may include information granting the input controller permission to transfer data of a packet queue of the plurality of packet queues. The output controller may generate the permission information based on a quality-of-service attribute relating to the packet queue.

According to some demonstrative embodiments of the invention, the output controller may generate the permission information based on an availability of a storage resource of the output controller.

According to some demonstrative embodiments of the invention, the permission information may include at least one credit granted by the output controller. The granted credit may indicate a predefined amount of data.

According to some demonstrative embodiments of the invention, the input controller may include at least one input port to receive the at least one packet.

According to some demonstrative embodiments of the invention, the fabric may include, or may be, a buffered fabric.

According to some demonstrative embodiments of the invention, the input controller and output controller may communicate the permission information and/or status information over the fabric.

According to some demonstrative embodiments of the invention, the input controller and output controller may communicate the permission information and/or status information externally to the fabric.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

Figure 1:
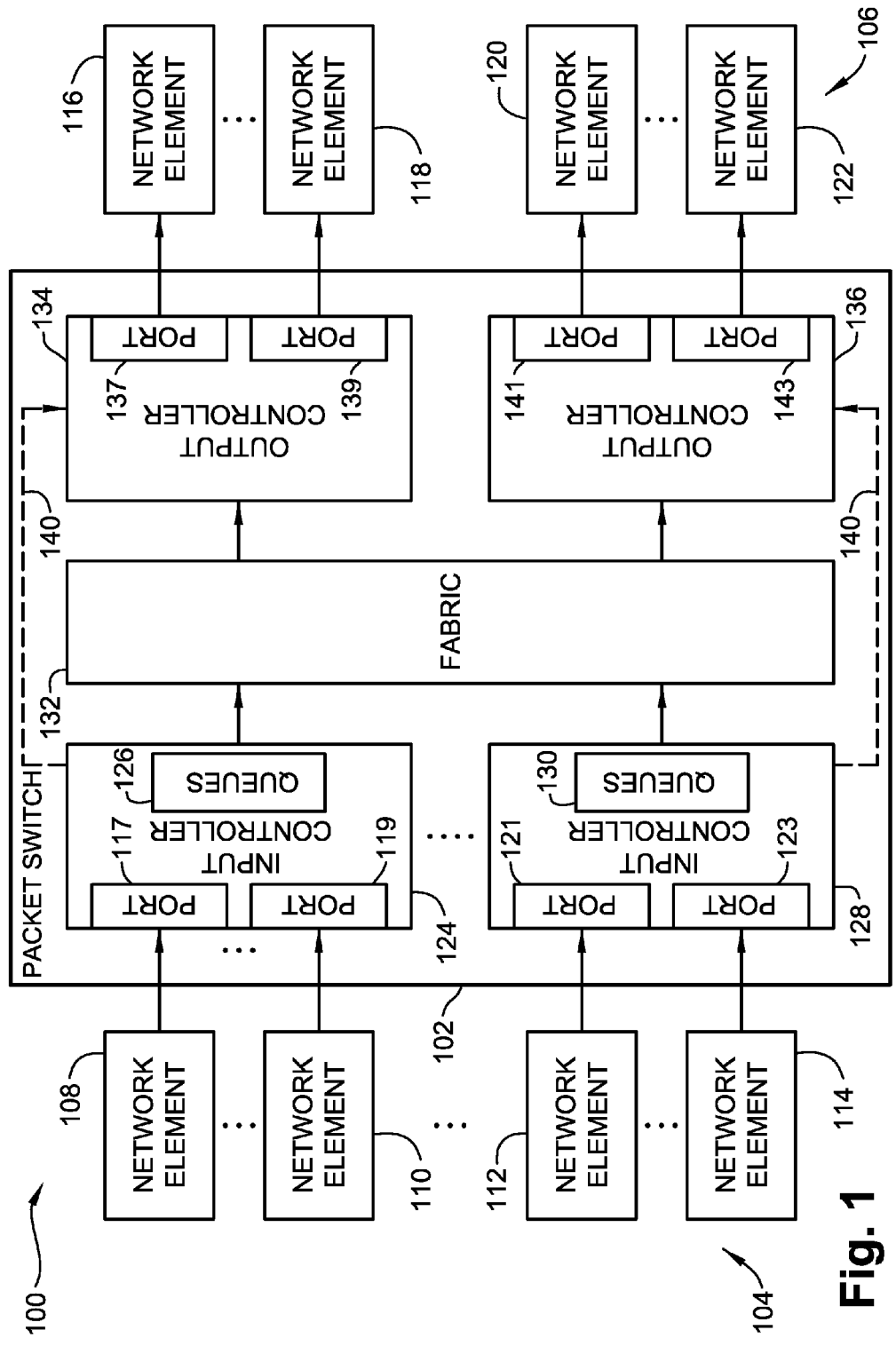
FIG. 1 is a schematic illustration of a communication network according to some demonstrative embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Moreover, some of the blocks depicted in the drawings may be combined into a single function.

DETAILED DESCRIPTION OF SOME DEMONSTRATIVE EMBODIMENTS OF THE INVENTION

In the following detailed description, numerous specific details are set forth in order to provide a thorough understanding of embodiments of the invention. However, it will be understood by those of ordinary skill in the art that embodiments of the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The phrase "QoS profiles", as used in some demonstrative embodiments of the invention, may relate to a set of one or more performance measures in accordance with any suitable industry standards and/or implementation agreements. The QoS profiles may be defined, for example, in accordance with the Internet Engineering Task Force (IETF) differentiated services (DiffServ) specifications, MEF, DSL Forum Technical Report 59 (TR59), International Telecommunication Union (ITU) standards, and/or any other standard, specification and/or agreement. The QoS profiles may refer, for example, to the probability that a network will meet predefined traffic flow requirements, or the probability that a packet will be transmitted successfully between two network elements within a desired period of time. The QoS profiles may relate, for example, to committed rates, excess rates, committed burst sizes, excess burst sizes, data priorities corresponding to committed and excess rates, and the like.

Part of the discussion herein may relate, for exemplary purposes, to receiving and/or transmitting a data packet. However, embodiments of the invention are not limited in this regard, and may include, for example, receiving and/or transmitting a frame, a block, a data portion, a data sequence, a data signal, a content, an item, a message, or the like.

It should be understood that embodiments of the present invention may be used in a variety of applications. Although the present invention is not limited in this respect, the circuits and techniques disclosed herein may be used in many apparatuses such as network elements, for example, network switches, routers and the like.

Reference is made to FIG. 1, which schematically illustrates a communication network 100 according to some demonstrative embodiments of the invention. It will be appreciated by those skilled in the art that the simplified components schematically illustrated in FIG. 1 are intended for demonstration purposes only, and that network 100 may include any other suitable components. It is noted that components of network 100 may include capabilities, structures and/or functionalities, e.g., as are described below in reference to FIGS. 2, 3 and/or 4. Moreover, where considered appropriate, component names and reference numerals may be similar among the drawings to indicate corresponding or analogous elements.

According to some demonstrative embodiments of the invention, network 100 may include at least one packet switch 102 to transfer a plurality of data packets between a plurality of network elements, e.g., including network elements 108, 110, 112, 114, 116, 118, 120, and/or 122. Network elements 108, 110, 112, 114, 116, 118, 120, and/or 122 may include any suitable network element or node adapted to communicate data, e.g., in the form of data packets as known in the art. Although the invention is not limited in this respect, one or more of network elements 108, 110, 112, 114, 116, 118, 120, and/or 122 may include a packet switch, e.g., able to perform the functionality of packet switch 102. Accordingly, packet switch 102 may be able to transfer data packets from/to another network element, e.g., another packet switch or a computer.

According to some demonstrative embodiments of the invention, two or more of the network elements ("source nodes"), e.g., network elements 108, 110, 112, and/or 114, may be adapted to transmit to packet switch 102 data packets intended to be received by one or more of the network elements ("destination nodes"), e.g., network elements 116, 118, 120 and/or 122, which may be adapted to receive the data packets.

Although some demonstrative embodiments of the invention are described with relation to one or more source nodes and one or more destination nodes implemented as separate network elements or modules, it will be appreciated by those of ordinary skill in the art that the invention is not limited in this respect and that one or more of the source nodes may also perform the functionality of one or more of the destination nodes; one or more of the destination nodes may also perform the functionality of one or more of the source nodes; and/or one or more of the source and destination nodes may implemented as part of a single network element or node. For example, one or more of network elements 108, 110, 112 and 114 may be adapted to receive data packets from packet switch 102; one or more of network elements 116, 118, 120, and 122 may be adapted to transmit data packets to packet switch 102; and/or one or more of network elements 108, 110, 112 and 114 may be implemented together with one or more of elements 116, 118, 120 and 122 as a single network element.

According to some demonstrative embodiments of the invention, packet switch 102 may include at least one input controller, e.g., input controllers 124 and 128, to schedule transport of at least one data packet to at least one output controller, e.g., output controllers 134 and 136, over a fabric 132 based on permission information received from the output controller, as described in detail below. Although the invention is not limited in this respect, fabric 132 may include, for example, a buffered fabric, e.g., as is known in the art.

According to some demonstrative embodiments of the invention, input controllers 124 and/or 128 may include one or more input ports to receive the data packets from the source nodes, e.g., from network elements 108, 110, 112, and/or 114. For example, input controller 124 may include ports 117 and 119 to communicate with network elements 108 and 110, respectively; and input controller 128 may include ports 121 and 123 to communicate with network elements 112 and 114, respectively. Output controllers 134 and/or 136 may include one or more output ports to provide the data packets to the destination nodes, e.g., to network elements 116, 118, 120, and/or 122. For example, output controller 134 may include ports 137 and 139 to communicate with network elements 116 and 118, respectively; and output controller 136 may include ports 141 and 143 to communicate with network elements 120 and 122, respectively. Ports 117, 119, 121, 123, 137, 139, 141 and 143 may include any suitable ports, e.g., as are known in the art.

According to some demonstrative embodiments of the invention, data may be transmitted from one or more of the source nodes to input controllers 124 and/or 128, e.g., via ports 117, 119, 121, and/or 123; from input controllers 124 and/or 128 to fabric 132; from fabric 132 to output controllers 134 and/or 136; and/or from output controllers 134 and/or 136 to one or more of the destination nodes, as described in detail below.

According to some demonstrative embodiments of the invention, at least one of input controllers 124 and 128 may be adapted to schedule transfer of a data packet before the data packet is actually transmitted across fabric 132. Data that is scheduled for transmission prior to the actual transmission of the data may be referred to herein as "pre-scheduled data".

According to some demonstrative embodiments of the invention, input controllers 124 and/or 128 may be adapted to schedule the transfer of the data packet based on permission information received from output controllers 134 and/or 136. For example, an input controller of input controllers 124 and 126 intended to transfer a data packet to a target output controller of output controllers 134 and 136 may wait to receive signals indicating, for example, that the target output controller is capable of efficiently receiving the data packet. The permission information may be generated by the target output controller based, for example, on status information received from the input controller, as described below.

The pre-scheduling data according to some embodiments of the invention, e.g., as described herein, may regulate the rate at which the data is sent across fabric 132, thus reducing blocking and oversubscription to output controllers 134 and/or 136. Since data transport may be scheduled outside of fabric 132, e.g., at input controllers 124 and/or 128 and output controllers 134 and/or 136, fabric 132 need not be capable of complex scheduling operations. Thus, network 100 may be used to transport a relatively large amount of data across fabric 132, which may include relatively simple fabric architectures, for example, with minimal buffer space and simplified scheduling mechanisms. In one non-limiting example, fabric 132 may include, or may be, a buffered fabric, such as an Ethernet switch, with a simple one FIFO queue per output link with enough memory to ensure fully pipelined operation.

According to some demonstrative embodiments of the invention, output controllers 134 and/or 136 may be adapted to generate the permission information based, for example, on status information from input controllers 124 and/or 128, and/or fabric 132. For example, the status information may include an indication relating to an amount of data intended for the target output controller pending transmission at input controllers 124 and/or 128, and/or an amount of data pending transmission at fabric 132, e.g., as described below. The permission information may be transferred over fabric 132 and/or via any other suitable connection, e.g., as described below.

According to some demonstrative embodiments of the invention, at least one of input controllers 124 and 128 may manage a plurality of packet queues according to desired parameters. At least one of the packet queues may be associated with one or more data packets intended to be transferred to one of the plurality of output controllers, and/or one or more output ports of one of the plurality of output controllers. For example, input controller 124 may manage a plurality of Virtual Output Queues (VOQs) 126; and/or input controller 128 may manage a plurality of VOQs 130. Although the invention is not limited in this respect, a data packet may be associated with a VOQ of VOQs 130 based, for example, on a destination of the packet and, optionally, on a predefined QoS profile or any priority information associated with the data packet. VOQs 126 and/or 130 may include, for example, variable sized data packets. Although the invention is not limited in this respect, the data packets may be segmented into cells.

Although the invention is not limited in this respect, in some demonstrative embodiments, one or more VOQs of VOQs 126 and/or 130 may include data packets intended to be transported to a specific destination, for example, a specific one of output controllers 134 and 136, or a specific set of one or more ports of the specific output controller. For example, queues 126 may include a first VOQ associated with one or more data packets to be transferred to port 137; a second VOQ associated with one or more data packets to be transferred to port 134, and a third VOQ associated with one or more packets to be transferred to ports 141 and 143. In one embodiment, one or more of queues 126 and 130 may maintain the actual data packets that may be transmitted across fabric 132. In another embodiment, one or more of queues 126 and 130 may be associated with the data packets, e.g., by maintaining addresses pointing to an address of a storage area (not shown) in which the data packets may be stored.

According to some demonstrative embodiments of the invention, input controllers 124 and/or 128 may communicate with output controllers 134 and/or 136 to schedule data in order to optimize data flow throughout packet switch 102. For example, input controller 124 may request output controller 136 for permission to transmit data packets of the first VOQ intended for port 137. Controller 136 may generate the permission information, which may indicate an amount of data that once transmitted, may be efficiently transferred through fabric 132 and received by output controller 136. Input controller 124 may transmit one or more packets of the first VOQ across fabric 132, e.g., based on the permission information.

According to some demonstrative embodiments of the invention, the permission information generated by the target output controller may include any suitable indication of one or more permission parameters relating to the transportation of data, e.g., including an amount, type, and/or timing of the data transportation. Although the invention is not limited in this respect, the permission information may include, for example, one or more permission credits ("credits"), e.g., as described below.

According to some demonstrative embodiments of the invention, input controller 124 may update a plurality of credit balances corresponding to queues 126, respectively, based on the permission information received from output controllers 134 and/or 136. Input controller 124 may also schedule transport of the data packets associated with queues 126 based on the plurality of credit balances. Input controller 128 may update a plurality of credit balances corresponding to queues 130, respectively, based on the permission information received from output controllers 134 and/or 136. Input controller 128 may also schedule transport of the data packets associated with queues 130 based on the plurality of credit balances.

According to one demonstrative embodiment of the invention, at least one of input controllers 124 and 128 ("the requesting input controller") may generate a request to the target output controller to generate permission information corresponding to a specific packet queue, e.g., a queue of queues 126 or 130, based for example, on a credit balance corresponding to the packet queue, a size ("fill level") of the packet queue, and/or an amount of data already scheduled for transmission from the packet queue. For example, the requesting input controller may generate the request based on a difference between the credit balance corresponding to the packet queue and the size of the packet queue, e.g., as described below with reference to FIG. 2.

According to some demonstrative embodiments of the invention, the requesting input controller, may schedule the transport of the data packet at a time that may optimize the flow of data throughout packet switch 102, e.g., by requesting permission and transmitting the data packet based on the response from the target output controller.

According to another demonstrative embodiment of the invention, the requesting input controller may generate the request to the target output controller based on one or more of the credit balances corresponding to one or more of packet queues other than the specific packet queue, e.g., as described below with reference to FIG. 2.

According to some demonstrative embodiments of the invention, the requesting input controller may be adapted to schedule transmission over fabric 132 of one or more data packets of the specific packet queue if a credit balance corresponding to the specific packet queue is bigger than a predefined threshold, e.g., as described below with reference to FIG. 2.

According to some demonstrative embodiments of the invention, the requesting input controller may be adapted to update the credit balance corresponding to the packet queue when a data packet of the packet queue is transmitted, e.g., as described below with reference to FIG. 2.

According to some demonstrative embodiments of the invention, output controller 134 and/or 136 may be adapted to grant the requesting input controller with credit in the form of an information signal. The information signal may define permission parameters related to the transportation of data, for example, a specific type of data packet or an amount or rate of data permitted, from one or more specific VOQs to the output controller. In one embodiment, the credit may have a numerical value in predefined units, for example, data bytes. In some embodiments, the information signal may result in a permitted data transmission rate corresponding, for example, to the number of credits that are transmitted per second. The permitted credit rate may be based, for example, on a maximum rate that data may be transmitted from the specific VOQ to the output controller. For example, in some embodiments the credit rate may be measured in terms of Mega bits per second (Mbps), divided by a number of bytes (B) corresponding to each credit, e.g., with units of bytes/credit, then divided by 8 bits/byte.

According to some demonstrative embodiments of the invention, output controllers 134 and/or 136 may assign credit for transmitting fixed amounts of data, for example, 256 bytes of data, or any other specified amount of data. In other embodiments, different amounts of credit may be assigned for transmitting variable amounts of data.

According to some demonstrative embodiments of the invention, the credit assigned to a specific input controller may indicate to which one or more of the plurality of output controllers, the specific input controller may be permitted to transmit data. For example, the credit may be of a specific type or may be marked, for example, with information identifying a specific one or more of output controllers 134 and 136 to which the data may be transmitted, or may be marked with information identifying a specific VOQ from which the data is to be transmitted. In one embodiment, only the output controller to which the permission information relates may generate the permission information. In another embodiment, the permission information may permit transmission of a data to two or more, or any, of output controllers 134 and 136.

According to some demonstrative embodiments of the invention, the permission information may include information granting the requesting input controller permission to transfer data of the packet queue of the requesting input controller; and the target output controller may generate the permission information based on a quality-of-service attribute relating to the packet queue, e.g., as described below with reference to FIG. 3.

According to some demonstrative embodiments of the invention, output controllers 134 and/or 136 may generate the permission information based on an availability of a storage resource of output controllers 134 and/or 136, respectively, e.g., as described below with reference to FIG. 3.

According to some demonstrative embodiments of the invention, at least part of the permission information, e.g., including the credit requests and/or credit assignments, may be sent in-band, e.g., across fabric 132. For example, the credit requests and/or credit assignments may be transferred across fabric 132 in the form of control cells or messages. According to other embodiments, at least part of the permission information credit requests and/or credit assignments may be sent out-of band. For example, input controllers 124 and/or 128 may use a connection 140, e.g., including another fabric, to communicate the credit requests and/or credit assignments. Since in-band transmissions are affected by, and may contribute to, congestion in fabric 132, credit requests and credit assignments transmitted out-of-band may bypass congestion in fabric 132 and thus may improve the efficiency of network 100.

According to some demonstrative embodiments of the invention, data may be scheduled locally at input controllers 124 and 128, based on the credit assignments from output controllers 134 and 136. Scheduling the data locally at input controllers 124 and 128, and output controllers 134 and 136, may enable allocating the computational effort associated with scheduling the data packets among the input and output controllers. In one non-limiting example, each of output controllers 134 and 136 may assign credit for the transmission of data packets to itself. Thus, output controllers 134 and 136 may collectively have a processing capacity to fulfill substantially most, e.g., all, aspects of QoS profiles for transporting data.

Figure 2:
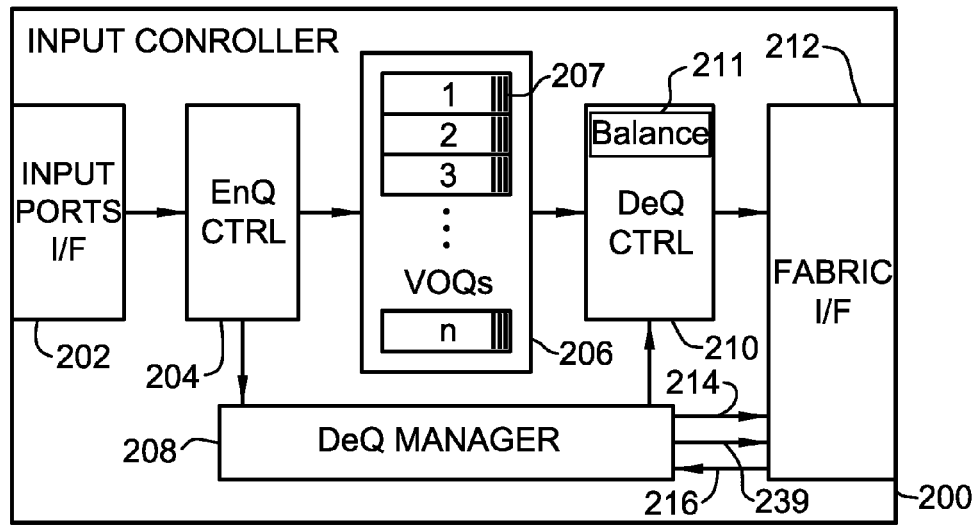
FIG. 2 is a schematic illustration of an input controller according to some demonstrative embodiments of the invention.

Reference is now made to FIG. 2, which schematically illustrates an input controller 200 according to some demonstrative embodiments of the invention. Although the invention is not limited in this respect, according to some demonstrative embodiments input controller 200 may perform the functionality of input controller 124 and/or input controller 128 (FIG. 1), e.g., to pre-schedule the transportation of data based on permission information, e.g., permission credit, received from at least one target output controller, e.g., output controller 134 and/or 136 (FIG. 1).

According to some demonstrative embodiments of the invention, input controller 200 may include one or more input ports 202 to receive data packets from one or more network elements. Although the invention is not limited in this respect, ports 202 may perform the functionality of ports 117, 119, 121 and/or 123 (FIG. 1). Input controller 200 may also include a fabric interface (I/F) 212 to communicate with a fabric, e.g., fabric 132 (FIG. 1). Interface 212 may include any suitable fabric interface, e.g., as is known in the art.

According to some demonstrative embodiments of the invention, input controller 200 may maintain a plurality of queues 206, e.g., including at least one VOQ 207.

According to some demonstrative embodiments of the invention, input controller 200 may include an enqueuer 204, a dequeue manager 208, and a dequeuer 210. Enqueuer 204 may be adapted to associate data packets received via ports 202 with one or more of queues 206; and/or dequeuer 210 may be adapted to dequeue one or more data packets of queues 206 to be transferred to the fabric via fabric interface 212, e.g., as described in detail below.

According to some demonstrative embodiments of the invention, dequeue manager 208 may receive from enqueuer 204 queuing information regarding a data packet enqueued by enqueuer 204. The queuing information may include, for example, one or more parameters relating to the enqueued packet, e.g., a VOQ number, a destination of the packet, a type of the packet, a QoS profile associated with the packet, and the like.

According to some demonstrative embodiments of the invention, dequeue manager 208 may also be adapted to manage the dequeuing of one or more data packets from queues 206, by controlling dequeuer 210, based on permission information, e.g., in the form of one or more permission credits 216, received from an output controller, e.g., output controller 134 and/or 136 (FIG. 1), via fabric interface 212, as described herein. In the demonstrative embodiments of FIG. 2, permission credits 216 may include in-band messages received via fabric interface 212, e.g., from fabric 132 (FIG. 1). However, the invention is not limited in this respect, and in other embodiments permission credits 216 may include out of band messages received, for example, over connection 140 (FIG. 1).

According to some demonstrative embodiments of the invention, dequeue manager 208 may also be adapted to generate one or more credit requests 214 to an output controller, e.g., output controller 134 and/or 136 (FIG. 1). In the demonstrative embodiments of FIG. 2, credit requests 214 may include in-band messages to be transferred via fabric interface 212, e.g., over fabric 132 (FIG. 1). However, the invention is not limited in this respect, and in other embodiments credit requests 214 may include out of band messages to be transferred, for example, over connection 140 (FIG. 1).

According to some demonstrative embodiments of the invention, permission credits 216 may indicate credit granted to queues 206, e.g., in the form of a number of credits granted to VOQ 207. For example, each credit may indicate a predefined amount of bytes, e.g., 256 bytes. The amount of bytes indicated per credit may not necessarily match a size of a data packet maintained by VOQ 207.

According to some demonstrative embodiments of the invention, dequeuer 210 may maintain at least one credit balance 211 corresponding to at least one VOQ 207, respectively. Although the invention is not limited in this respect, credit balance 211 may include a number representing an amount of data, e.g., a number of bytes. Dequeue manager 208 may control dequeuer 210 to increase credit balance 211, e.g., based on credit permission 216. For example, upon receiving credit permission 216 corresponding to VOQ 207, dequeue manager 208 may control dequeuer 210 to increase credit balance 211 by an amount of bytes indicated by credit permission 216. Dequeuer 211 may decrease credit balance 211, e.g., upon dequeuing one or more packets from VOQ 207, by the amount of data being dequeued.

According to some demonstrative embodiments of the invention, dequeuer 210 may transfer packets from VOQ 207, if credit balance 211 is greater than a predefined threshold, e.g., zero.

According to some demonstrative embodiments of the invention, dequeue manager 208 may selectively generate credit request 214 for VOQ 207 based on data recorded by dequeue controller 210 corresponding to VOQ 207, data communicated from the target output controller intended to receive data packets from VOQ 207, data from enqueuer 204 relating to packets enqueud at VOQ 207, and/or data received from other input and/or output controllers, e.g., as described below.

According to some demonstrative embodiments of the invention, dequeue manager 208 may generate credit request 214 corresponding to VOQ 207 based, for example, on an amount of data maintained by VOQ 207, e.g., a size of VOQ 207, and/or the amount of data indicated by credit balance 211 corresponding to VOQ 207. Credit request 214 may include any suitable format or information adapted to request from an output controller, e.g., output controller 134 and/or 136 (FIG. 1), permission to transfer data packets of VOQ 207 intended for the output controller.

According to some demonstrative embodiments of the invention, credit request 214 may indicate one of a plurality of predefined request states for VOQ 207. For example, the plurality of request states may include three request states, namely OFF, SLOW, and NORMAL, which may indicate three respective rates of requested credits. For example, the OFF state may indicate that no credit is requested for VOQ 207, the SLOW state may indicate that credit is requested at a rate smaller than or equal to a first predefined rate, and the NORMAL state may indicate that credit is requested at second predefined rate, e.g., a maximal rate defined by a QoS profile associated with VOQ 207. It will be appreciated that these three states may be implemented to control the rate at which credit is granted to VOQ 207, while reducing over allocation of credit to VOQ 207, e.g., as VOQ 207 is emptied.

According to some demonstrative embodiments of the invention, dequeue manager 208 may set the state of credit request 214 corresponding to VOQ 207 to the OFF state, e.g., when credit balance 211 corresponding to VOQ 207 is bigger than an amount of data pending transmission at VOQ 207 ("the size of the VOQ"). In one example, dequeue manager 208 may set the state of credit request 214 corresponding to VOQ 207 to the OFF state when VOQ 207 is substantially empty, and credit balance 211 corresponding to VOQ 207 is greater than a first predefined state threshold. In another example, dequeue manager 208 may set the state of credit request 214 corresponding to VOQ 207 to the OFF state when credit balance 211 is greater than a second predefined state threshold. Dequeue manager 208 may set the state of credit request 214 corresponding to VOQ 207 to either one of the NORMAL or SLOW states, e.g., based on the amount of data pending transmission at VOQ 207. For example, dequeue manager 208 may set the state of credit request 214 to the NORMAL state, e.g., when VOQ 207 includes a large amount of data, e.g., equal to or larger than a third predefined state threshold; and to the slow state, e.g., when the size of VOQ 207 reduces, e.g., below the third state threshold.

According to some demonstrative embodiments of the invention, VOQ 207 may physically store packet descriptors, e.g., while actual data is stored in another, e.g., external, memory (not shown). Dequeuer 210 may maintain a fabric transmission queue including packet descriptors which where dequeued from VOQ 207. Although the invention is not limited in this respect, an amount of data described by all packet descriptors stored in the fabric transmission queue may be used as a measure of the total data waiting transmission. For example, the fabric transmission queue may include three descriptors describing packet sizes of 0.5 KB, 1.5 KB, and 9 KB, respectively. Accordingly, the total amount of data described by the descriptors may equal 11 KB. Dequeue manager 208 may generate input blocking information 239 to be provided to inform one or more output controllers associated with input controller 200, e.g., output controllers 134 and 136 (FIG. 1), when the total data described in the fabric transmission queue exceeds a predefined input-blocking threshold. Input blocking information 239 may be related to the amount of data pending transmission at input controller 200.

Figure 3:
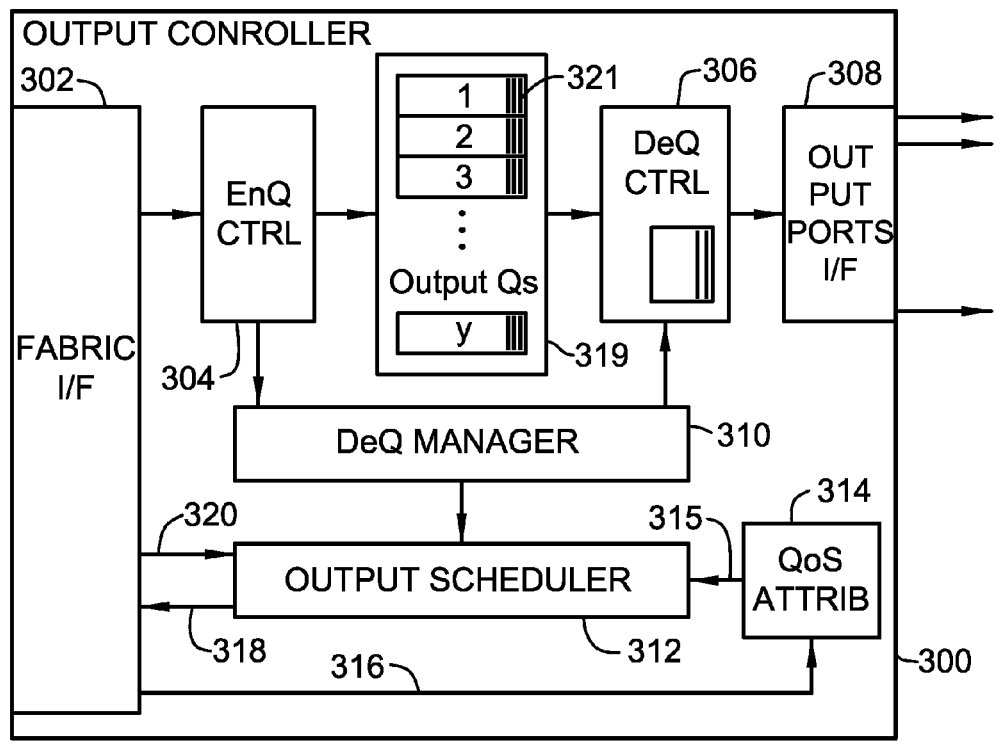
FIG. 3 is a schematic illustration of an output controller according to some demonstrative embodiments of the invention.

Reference is now made to FIG. 3, which schematically illustrates an output controller 300 according to some demonstrative embodiments of the invention. Although the invention is not limited in this respect, according to some demonstrative embodiments output controller 300 may perform the functionality of output controller 134 and/or output controller 136 (FIG. 1), e.g., to provide permission information, e.g., permission credit, to at least one requesting input controller, e.g., input controller 124 and/or 128 (FIG. 1), and/or to queue data received from the input controller.

According to some demonstrative embodiments of the invention, output controller 300 may include a fabric interface 302 to communicate with a fabric, e.g., fabric 132 (FIG. 1). Interface 302 may include any suitable fabric interface, e.g., as is known in the art. Output controller 300 may also include one or more output ports 308 to provide data packets to one or more network elements, e.g., destination network elements 116, 118, 120 and/or 122 (FIG. 1). Although the invention is not limited in this respect, ports 308 may perform the functionality of ports 137, 139, 141, and/or 143 (FIG. 1).

According to some demonstrative embodiments of the invention, output controller 300 may grant permission to one or more requesting input controllers, e.g., input controller 200 (FIG. 2), to transmit data stored in a VOQ, e.g., VOQ 207 (FIG. 2), to one or more of output ports 308, for example, by assigning the input controller credit for the VOQ to transmit data to output controller 300.

According to some demonstrative embodiments of the invention, output controller 300 may include a buffer 319 to maintain a plurality of output queues 321 of data packets to be provided to output ports 308. In one example, output queues 321 may store the data packets. In another example, output queues 321 may store addresses pointing to the data packets. For example, the data packets may be stored in another storage area (not shown), for example, a memory, e.g., external to output controller 300.

According to some demonstrative embodiments of the invention, output controller 300 may include an enqueuer 304, a dequeue manager 310, and a dequeuer 306. Enqueuer 304 may be adapted to associate data packets received via interface 302 with one or more of queues 321. For example, enqueuer 304 may enqueue packets received from interface 302 to output queues 321 according to one or more output ports of ports 308 to which the packets are destined, and/or according to traffic class of the packets. Dequeuer 306 may be adapted to dequeue one or more data packets of queues 321 to be transferred via ports 308.

According to some demonstrative embodiments of the invention, dequeue manager 310 may receive from enqueuer 304 information regarding data packets enqueued by enqueuer 304. Dequeue manager 310 may also be adapted to manage the dequeuing of one or more data packets from queues 321, by controlling dequeuer 310.

According to some demonstrative embodiments of the invention, output controller 300 may also include an output scheduler 312 adapted to grant permission information, e.g., including one or more credit permissions 318 to a VOQ of the requesting input controller, based for example, on a credit request 320 received from the requesting input controller. For example, output controller 300 may receive, e.g., from input controller 200 (FIG. 2), credit request 320 including credit request 214 (FIG. 2) corresponding to VOQ 207 (FIG. 2).

According to some demonstrative embodiments of the invention, output scheduler 312 may grant credit permission 318 based, for example, on credit request 320 and/or output queue information corresponding to an intended output queue of queues 319 to receive the data of the VOQ. The output queue information may be provided to output scheduler 312 by dequeue manager 310. The output queue information may include, for example, an amount of data in the intended output queue, and/or an amount of free space of buffer 319 related to the intended output queue. Output scheduler 312 may grant credit permission 318 based on additional or alternative parameters including, for example, QoS attributes and/or fabric congestion, e.g., as described below.

According to some demonstrative embodiments of the invention, output controller 300 may also include a QoS attribute module 314 to maintain one or more QoS attributes. The QoS attributes may include guarantees of parameters, such as, packet delay, packet discard, committed information rate, excess information rate, committed burst size, and excess burst size, and the like. QoS attribute module 314 may provide output scheduler 312 with QoS attributes 315, e.g., per VOQ, based for example, on configuration parameters and input blocking status 316 of input controllers. Input blocking status 316 may include, for example, input blocking information 239 (FIG. 2). Output scheduler 312 may apply the QoS attributes to the VOQs or to aggregates of the VOQs, e.g., including collections of VOQs or collections of aggregates. In some non-limiting embodiments, the QoS attributes may be designed to substantially perform in accordance with suitable industry standards and/or implementation agreements, e.g., the IETF DiffServ, MEF, TR59, ITU, and the like.

According to some demonstrative embodiments of the invention, output scheduler 312 may receive from one or more input controllers credit requests relating to VOQs ("requesting VOQs") of the one or more input controllers, and use the credit requests to determine an amount or type of credit to assign to the requesting VOQs. In one embodiment, output scheduler 312 may assign an amount or type of credit to a requesting VOQ, for example, based on various parameters, e.g., data transport capacity and/or activity of various parts of the fabric, actual or estimated activity at output controller 300, available space at buffer 319, prior credit assigned to the requesting VOQ, current credit available to the requesting VOQ, the QoS profile or any priority associated with one or more data packets of the requesting VOQ, and the like.

According to some demonstrative embodiments of the invention, output scheduler 312 may receive from QoS attribute module 314 QoS attributes 315 including QoS profile guarantees associated with a requesting VOQ. Output scheduler 312 may determine the amount, rate or type of credit to assign to the VOQ in a way that is consistent with QoS guarantees associated with the VOQ. In one example, one credit may permit an input controller to transmit a predefined amount of data, e.g., 256 bytes of data, from the requesting VOQ. If, for example, the requesting VOQ is committed to a QoS guarantee requiring a transmission rate of 10 Mbps, then output scheduler 312 may assign credit to the requesting VOQ at a rate of 10 Mbps/(256B/Credit*8 bits/B), which is approximately equal to a rate of 4883 credits per second.

According to some demonstrative embodiments of the invention, there may be a specific and/or limited bandwidth, and thus a limited data transmission rate, available in the fabric, e.g., fabric 132 (FIG. 1), for transporting the data packets from the VOQs to output controller 300. In one example, output scheduler 312 may receive, e.g., from the fabric, information regarding the capacity of the fabric, e.g., in the form of dedicated messages and/or cells, and/or as part of the data packets received over the fabric. Output scheduler 312 may limit a total amount of the credit assigned to the VOQs, e.g., in order to prevent oversubscribing in the fabric. For example, one credit may permit transmission of 256 bytes of data, from a specific VOQ across the fabric within specific bandwidth to output controller 300. If the specific bandwidth of the fabric supports a limited rate of data traffic, for example, 15 Gigabits per second (Gbps), then output scheduler 312 may limit the total rate of credit assigned to all the requesting VOQs to, e.g., 15Gbps/(256B/Credit*8 bits/B), which is approximately equal to a rate of 7,324,000 credits per second.

According to some demonstrative embodiments of the invention, output scheduler 312 may, additionally or alternatively, limit credit assigned to the requesting VOQs according to an available or unused space of buffer 319. For example, output scheduler 312 may not assign credit if the available space in buffer 319 is below a predefined buffer threshold, e.g., in order to prevent an overflow of data sent to buffer 319, and/or to reserve space in buffer 319 for certain types of transmission, for example, from VOQs with relatively high QoS guarantees.

Figure 4:
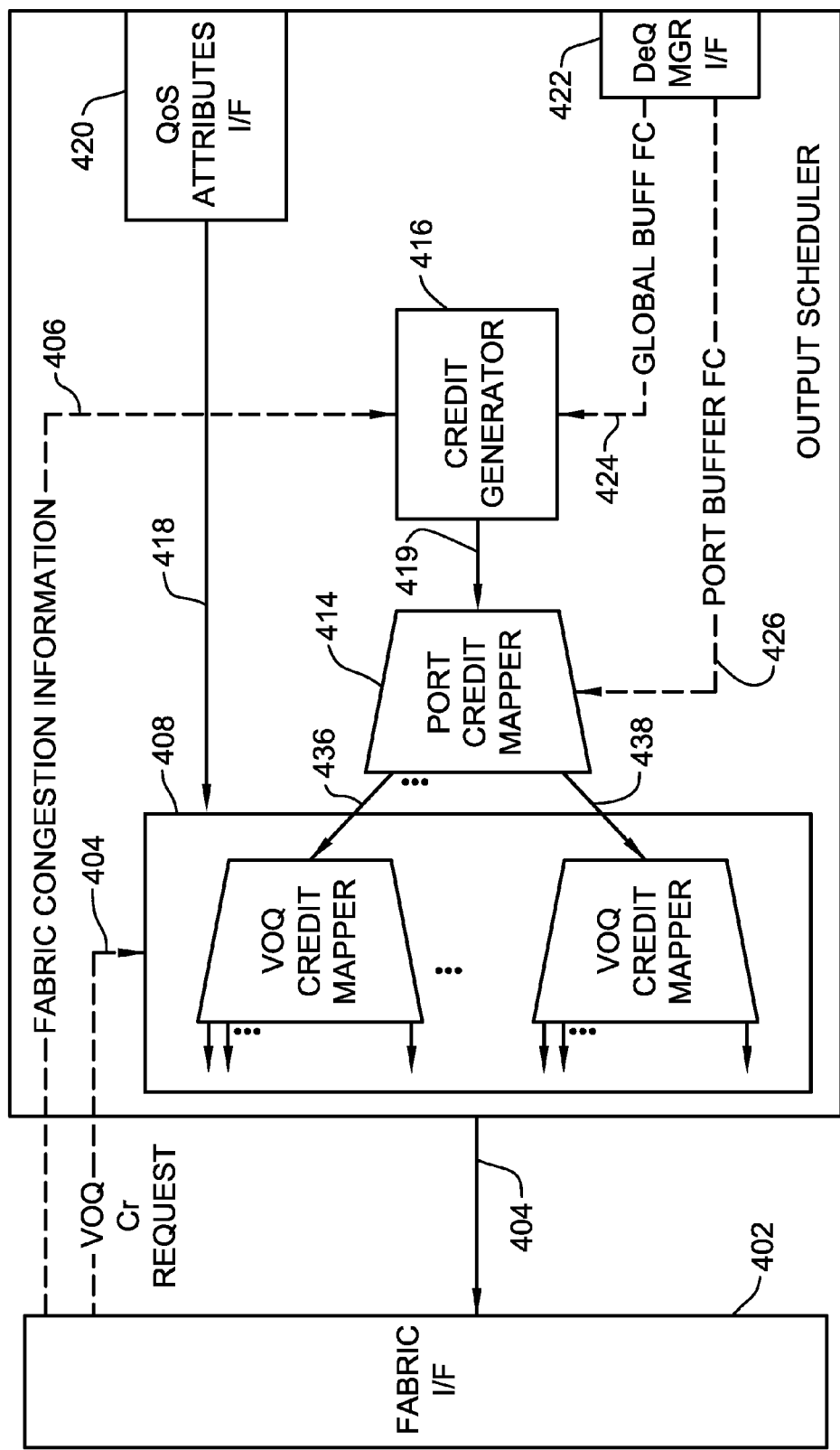
FIG. 4 is a schematic illustration of an output scheduler according to some demonstrative embodiments of the invention.

Reference is now made to FIG. 4, which schematically illustrates an output scheduler 400 according to some demonstrative embodiments of the invention. Although the invention is not limited in this respect, output scheduler 400 may perform the functionality of output scheduler 312 (FIG. 3) as part of an output controller, e.g., output controller 300 (FIG. 3), to generate permission credit 404 to be transferred to one or more requesting input controllers via a fabric interface 402. In this example, fabric interface 402 may include fabric interface 302 (FIG. 3), and credit permission 404 may include credit permission 318 (FIG. 3).

According to some demonstrative embodiments of the invention, output scheduler 400 may include a QoS attribute interface 420 adapted to communicate with a QoS attribute module, e.g., module 314 (FIG. 3). For example, output scheduler 400 may receive via interface 420 QoS attributes 418 corresponding to the data packets. QoS attributes 418 may include, for example, attributes 315 (FIG. 3).

According to some demonstrative embodiments of the invention, output scheduler 400 may also include a dequeue manager interface 422 adapted to communicate with a dequeue manager, e.g., dequeue manager 310 (FIG. 3). For example, output scheduler 400 may receive via interface 422 a global flow control (fc) signal 424, and/or a port buffer fc signal 426. Signal 424 may be asserted, e.g., by dequeue manager 310 (FIG. 3), for example, when available resources fall below a specific level.

According to some demonstrative embodiments of the invention, output scheduler 400 may also include a credit generator 416 to generate permission credits 419, e.g., at a rate that may be consistent with fabric congestion and/or available buffer at the output controller, e.g., buffer 319 (FIG. 3). For example, credit generator 416 may generate permission credits 419 based on flow control signal 424 and/or fabric congestion information 406, which may be received, for example, from fabric 132 (FIG. 1), e.g., via interface 402. Information 406 may be received, for example, in the form of one or more fabric cells, from one or more fabric devices, e.g., as is known in the art. Information 406 may include a measure of fabric congestion within the bandwidth designated for data transport to the output controller. Credit generator 416 may reduce a rate of assigning permission credit 419, or may stop assigning credit 419, for transporting data to the output controller, if for example, information 406 indicates that the fabric congestion within that bandwidth is above a predefined fabric congestion threshold.

According to some demonstrative embodiments of the invention, output scheduler 400 may also include a port credit mapper 414 to assign credit 419 to one or more ports of the output controller, e.g., one or more of ports 308 (FIG. 3); and a VOQ credit mapping module 408 adapted to map the credit, which was assigned by mapper 414 to the one or more ports, to the one or more VOQs of the one or more input controllers.

According to some demonstrative embodiments of the invention, port credit mapper 414 may assign the credit to the one or more ports based, for example, on one or more attributes, e.g., rate and/or priority, of the output ports; and/or based on whether VOQ credit mapping module 408 has a VOQ to which it can assign credit. For example, port credit mapper 414 may not assign credit to a specific output port while assigning credit to one or more other ports that may be eligible/requesting credits, e.g., if there is no VOQ that is requesting credit for the specific output port. This may be beneficial, for example, when the total bandwidth of the output ports associated with the output controller is greater than the bandwidth that may be transported to the output controller via the fabric. Port credit mapper 414 may include any suitable mapper, e.g., a Weighted Fair Queuing (WFQ) and/or Strict Priority scheduler with a rate limiter, as is known in the art.

According to some demonstrative embodiments of the invention, VOQ credit mapping module 408 may assign the credit to the VOQs based, for example, on the QoS attributes of the VOQs, the credit request state of the VOQs, and/or the input blocking state of the input controllers. For example, VOQ credit mapping module 408 may stop assigning credit to VOQs of an input controller at an input blocking state, e.g., which may be indicated by blocking status 316 (FIG. 3).

According to some demonstrative embodiments of the invention, VOQ credit mapping module 408 may map the credits to the VOQs based, for example, on QoS attributes 418.

According to some demonstrative embodiments of the invention, VOQ credit mapping module 408 may be internally hierarchical including, for example, interconnected WFQ and Strict Priority (SP) schedulers and rate limiting shapers. For example, a QoS profile may define groups ("aggregates") of two VOQs which are to be rate limited, e.g., to 1000 credits/second, while among the two VOQs the credit is to be assigned fairly, e.g., round-robin. In this example, VOQ credit mapping module 408 may include a two level hierarchy including a top level and a lower level. The top level may be adapted to assign credits at a first rate, e.g., a maximum rate of 1000 credits per second to the aggregate of the queues, and the lower level may be adapted to assign the credit among the two queues. It is noted that in this example, in one status neither one of the queues request credit, in another status only one of the queues may request credit, and in yet another status both the queues may request credit. Accordingly, VOQ credit mapping module 408 may assign no credit to the group, e.g., once VOQ receives the full 1000 credits per second, or each VOQ receives 500 credits per second respectively.

Figure 5:
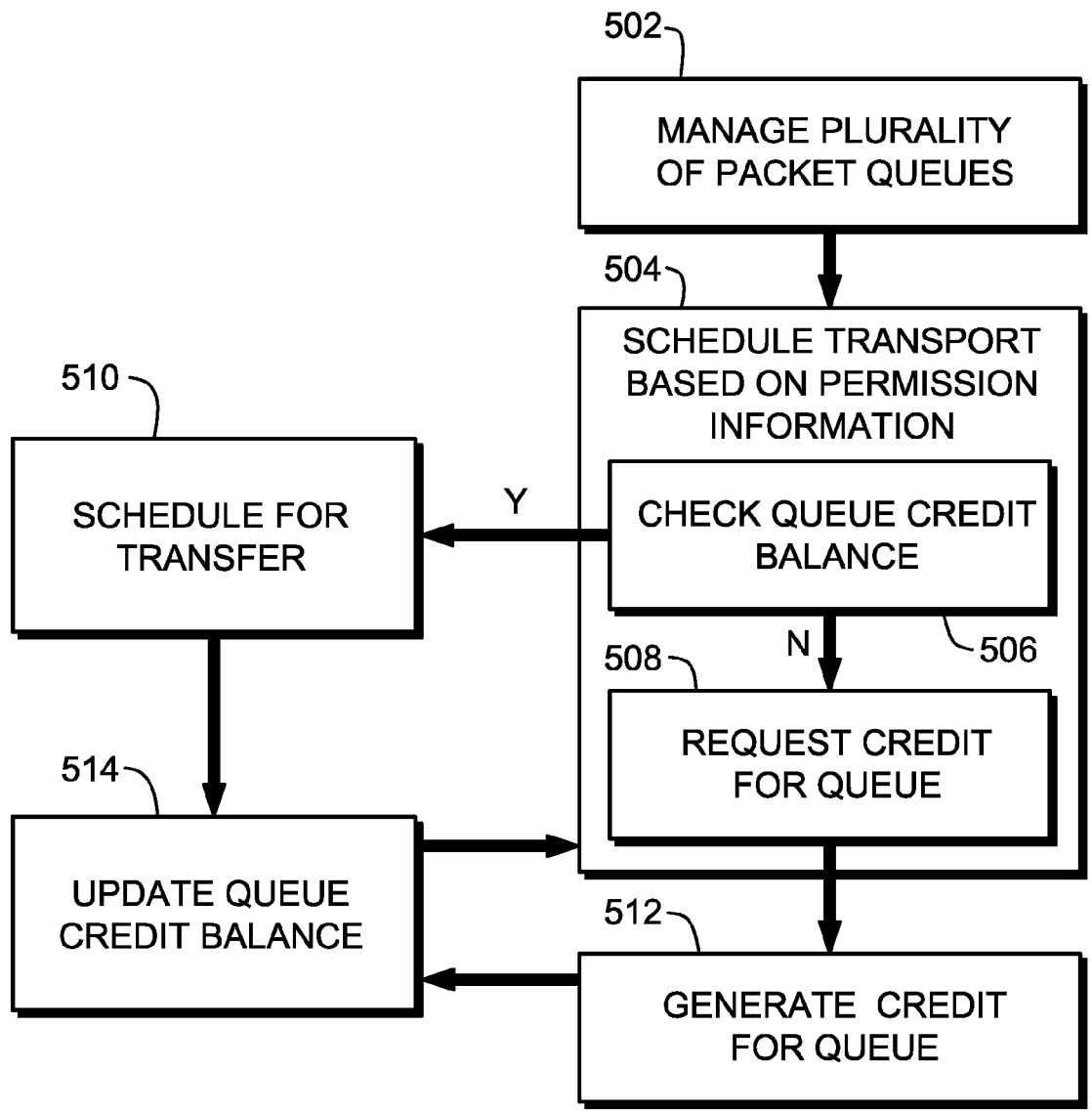
FIG. 5 is a schematic flow-chart illustration of a method of scheduling data transport across a fabric according to some demonstrative embodiments of the invention.

Reference is now made to FIG. 5, which schematically illustrates a method of scheduling data transport across a fabric according to some demonstrative embodiments of the invention. Although the invention is not limited in this respect, one or more operations of the method of FIG. 5 may be performed by network 100 (FIG. 1), packet switch 102 (FIG. 1), input controller 200 (FIG. 2), output controller 300 (FIG. 3), and/or output scheduler 400 (FIG. 4).

As indicated at block 504, the method may include scheduling transport of at least one data packet from an input controller to an output controller over a fabric based on permission information received from the output controller. For example, input controllers 124 and/or 128 (FIG. 1) may schedule transport of a data packet over fabric 132 (FIG. 1) based on permission information from output controllers 134 and/or 136 (FIG. 1).

According to some demonstrative embodiments of the invention, the at least one data packet may include a plurality of data packets. As indicated at block 502 the method may include managing a plurality of packet queues. One or more of the packet queues, e.g., each of the packet queues, may be associated with one or more of the plurality of data packets intended for one or more output ports of the output controller. For example, input controllers 124 and/or 128 (FIG. 1) may manage queues 126 and/or 130, as described above with reference to FIG. 1.

According to some demonstrative embodiments of the invention, the method may also include scheduling transport of a data packet associated with a packet queue of the plurality of packet queues based on a credit balance corresponding to the packet queue. As indicated at block 506, the method may include, for example, checking the credit balance corresponding to the packet queue based on at least one predefined criterion regarding the credit balance. As indicated at block 510, the method may include scheduling transport of the data packet if the criterion regarding the credit balance is met. For example, the method may include, scheduling transmission over the fabric of one or more data packets of a queue of the packet queues if a credit balance corresponding to the queue is bigger than a predefined threshold, e.g., as described above with reference to FIGS. 1 and/or 2.

As indicated at block 508 the method may also include generating a request to the output controller to generate permission information corresponding to the packet queue based, for example, on at least one of a credit balance corresponding to the packet queue, a size of the packet queue, and an amount of data already scheduled for transmission from the queues, e.g., as described above with reference to FIGS. 1 and/or 2. For example, the method may include generating the request if the criterion regarding the credit balance is not met.

According to some demonstrative embodiments of the invention, the method may include generating the request based on a difference between the credit balance corresponding to the packet queue and the size of the packet queue, e.g., as described above with reference to FIGS. 1 and/or 2.

According to some demonstrative embodiments of the invention, the method may include generating the request based on one or more of the credit balances corresponding to one or more of the packet queues other than the packet queue, e.g., as described above with reference to FIGS. 1 and/or 2.

As indicated at block 512, the method may also include generating the permission information based on status information from at least one of the input controller and the fabric. For example, the permission information may include information granting the input controller permission to transfer data of a packet queue of the plurality of packet queues. The method may include generating the permission information based on a quality-of-service attribute relating to the packet queue, e.g., as described above with reference to FIGS. 1, 3 and/or 4.

As indicated at block 514, the method may also include updating the plurality of credit balances corresponding to the plurality of packet queues, respectively, based on the permission information. For example, the method may include updating a credit balance corresponding to a packet queue of the plurality of packet queues when a data packet of the packet queue is transmitted. The method may also include updating the packet queue based on the permission information.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A switch comprising:
    an input controller configured to:
        determine a difference between an amount of data stored in a queue and a credit balance corresponding to the queue;
        request credit permission from an output controller, the request indicating the difference between the amount of data stored in the queue and the credit balance corresponding to the queue;
        increase the credit balance based on receiving a credit permission from the output controller;
        schedule at least one packet from the queue for transmission to the output controller if the credit balance exceeds a predefined threshold; and
        update the credit balance when the packet is transmitted to the output controller; and
    the output controller configured to grant the credit permission for the queue to the input controller based on the difference between the amount of data stored in the queue and the credit balance corresponding to the queue, as indicated by the request, and an amount of free buffer space in the output controller.

2. The switch of claim 1, wherein the credit permission permits the input controller to transmit a specific type of packet to the output controller.

3. The switch of claim 1, wherein:
    the input controller is configured to request the credit permission from the output controller, the request including either an OFF request state indicating that no credit is requested, a SLOW request state indicating that credit is requested at a rate smaller than or equal to a first predefined rate, or a NORMAL request state indicating that credit is requested at a maximal rate; and
    the output controller is configured to grant the credit permission to the input controller based on the request state.

4. The switch of claim 1, wherein:
    the input controller is configured to request the credit permission from the output controller based on a number of packets pending transmission at the input controller; and
    the output controller is configured to grant the credit permission to the input controller in response to receiving the request.

5. The switch of claim 1, wherein:
    the input controller is configured to request the credit permission from the output controller based on an available capacity of the queue; and
    the output controller is configured to grant the credit permission to the input controller in response to receiving the request.

6. The switch of claim 1, wherein the granted credit permission indicates a number of credits by which the input controller should increase the credit balance.

7. The switch of claim 1, wherein:
    the input controller comprises a first queue and a second queue, and the input controller is configured to:

determine whether a credit balance corresponding to each of the first queue and the second queue exceeds a predefined threshold;

schedule at least one packet from each of the first queue and the second queue for transmission to an output controller if the respective credit balance exceeds a predefined threshold;

update the credit balance for the respective queue when the packet is transmitted to the output controller; and increase the credit balance for an indicated queue based on receiving a credit permission from the output controller; and an output controller configured to grant credit permission for the indicated queue to the input controller based on an amount of free buffer space in the output controller.

8. A switch comprising:

an input controller configured to:

determine whether a credit balance corresponding to a queue exceeds a predefined threshold;

request credit permission from an output controller, the request including either an OFF request state indicating that no credit is requested, a SLOW request state indicating that credit is requested at a rate smaller than or equal to a first predefined rate, or a NORMAL request state indicating that credit is requested at a maximal rate;

increase the credit balance corresponding to the queue based on receiving a credit permission from the output controller;

schedule at least one packet from the queue for transmission to the output controller if the credit balance exceeds the predefined threshold; and update the credit balance when the packet is transmitted to the output controller; and the output controller configured to grant the credit permission for the queue to the input controller based on the request state.

9. A switch comprising:

an input controller configured to:

determine whether a credit balance corresponding to a queue exceeds a predefined threshold;

request credit permission from an output controller if the credit balance does not exceed the predefined threshold;

increase the credit balance based on receiving a credit permission from the output controller, the credit permission indicating a timing of transmitting a packet from the queue;

schedule the packet from the queue for transmission to the output controller at the time indicated by the credit permission received from the output controller; and update the credit balance when the packet is transmitted to the output controller; and the output controller configured to grant credit permission for the queue to the input controller, the credit permission including the timing of the packet transmission.

10. The switch of claim 9, wherein the credit permission permits the input controller to transmit a specific type of packet to the output controller.

11. The switch of claim 9, wherein:

the input controller is configured to request the credit permission from the output controller based on a number of packets pending transmission at the input controller; and the output controller is configured to grant the credit permission to the input controller in response to receiving the request.

12. The switch of claim 9, wherein:

the input controller is configured to request the credit permission from the output controller based on an available capacity of the queue; and the output controller is configured to grant the credit permission to the input controller in response to receiving the request.

13. The switch of claim 9, wherein the granted credit permission indicates a number of credits by which the input controller should increase the credit balance.

14. The switch of claim 8, wherein the output controller is configured to grant the credit permission based on the request state and a packet delay guarantee for the queue.

15. The switch of claim 8, wherein the output controller is configured to grant the credit permission based on the request state and a packet discard guarantee for the queue.

16. The switch of claim 8, wherein the output controller is configured to grant the credit permission based on the request state and a committed information rate guarantee for the queue.

17. The switch of claim 8, wherein the output controller is configured to grant the credit permission based on the request state and an excess information rate guarantee for the queue.

18. The switch of claim 8, wherein the output controller is configured to grant the credit permission based on the request state and a committed burst size guarantee for the queue.

19. The switch of claim 8, wherein the output controller is configured to grant the credit permission based on the request state and an excess burst size guarantee for the queue.

* * * * *